US006239222B1

(12) United States Patent
Nesbitt

(10) Patent No.: US 6,239,222 B1
(45) Date of Patent: *May 29, 2001

(54) GOLF BALL CORE COMPOSITIONS

(75) Inventor: R. Dennis Nesbitt, Westfield, MA (US)

(73) Assignee: Spalding Sports Worldwide, Inc., Chicopee, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/225,592

(22) Filed: Jan. 6, 1999

Related U.S. Application Data

(63) Continuation of application No. 08/819,945, filed on Mar. 18, 1997, now Pat. No. 5,895,105, which is a continuation of application No. 08/370,224, filed on Jan. 9, 1995, now abandoned, which is a continuation of application No. 07/893,277, filed on Jun. 4, 1992, now abandoned, which is a continuation-in-part of application No. 07/874,066, filed on Apr. 24, 1992, now abandoned.

(51) Int. Cl.$^7$ ..................................... A63B 37/06
(52) U.S. Cl. .................... 525/193; 525/232; 473/371; 473/372
(58) Field of Search .................. 525/193, 232; 473/371, 372

(56) References Cited

U.S. PATENT DOCUMENTS

| | | | |
|---|---|---|---|
| 3,432,165 | 3/1969 | Haines et al. | 525/232 |
| 3,478,132 | 11/1969 | Randolph | 260/998.14 |
| 3,572,721 | 3/1971 | Harrison et al. | 260/998.14 |
| 3,883,145 | 5/1975 | Cox et al. | 525/232 |
| 4,076,255 | 2/1978 | Moore . | |
| 4,082,288 | 4/1978 | Martin et al. | 260/998.14 |
| 4,264,075 | 4/1981 | Miller et al. | 260/998.14 |
| 4,266,772 | 5/1981 | Martin et al. | 525/274 |
| 4,328,133 | 5/1982 | Ogawa et al. | 525/232 |
| 4,838,556 | * 6/1989 | Sullivan . | |
| 5,131,662 | 7/1992 | Pollitt | 524/908 |
| 5,209,485 | 5/1993 | Nesbitt . | |
| 5,895,105 | * 4/1999 | Nesbitt . | |

\* cited by examiner

*Primary Examiner*—David J. Buttner

(57) ABSTRACT

The present invention is directed to improved polybutadiene compositions suitable for use in molded golf ball core construction. The improved polybutadiene compositions are composed of polypropylene powder resins which have the effect of increasing the hardness of the resulting molded cores without increasing the weight upon curing, thereby allowing for a reduction in the amount of crosslinking agents utilized and increasing the amount of fillers incorporated therein. The addition of the polypropylene powder resins to the core compositions lowers the cost of the molded core, while maintaining the proper weight and compression. The present invention is also directed to golf balls produced utilizing the improved core compositions. Furthermore, the invention is directed to a method for reducing the amount of crosslinking agents utilized to formulate a core composition through the incorporation of polypropylene powder resins. In addition, a method for decreasing the amount of crosslinking agents and increasing the amount of mineral fillers included in a core composition through the incorporation of polypropylene powder resins is also disclosed.

12 Claims, No Drawings

US 6,239,222 B1

GOLF BALL CORE COMPOSITIONS

This is a continuation of U.S. application Ser. No. 08/819,945, filed Mar. 18, 1997 now U.S. Pat. No. 5,895, 105; which is a continuation of U.S. application Ser. No. 08/370,224, filed Jan. 9, 1995 (abandoned); which is a continuation of U.S. application Ser. No. 08/893,277, filed Jun. 4, 1992 (abandoned), which is a continuation-in-part of U.S. application Ser. No. 07/874,066, filed on Apr. 24, 1992 (abandoned).

BACKGROUND OF THE INVENTION

The present invention is directed to improved polybutadiene compositions for use in molded golf ball core construction. The improved polybutadiene compositions contain polypropylene powder resins, which have the effect of increasing the hardness of the resulting molded cores without increasing the weight and/or substantially reducing the resiliency of the ball. The present invention is also directed to golf balls produced utilizing the improved core compositions.

Moreover, it has been found that the addition of the particulate polypropylene allows for a reduction in the amount of crosslinking agents utilized in the core compositions and/or an increase in the amount of higher specific gravity fillers, thereby dramatically decreasing the cost of the golf ball cores. A method for producing such an effect is also disclosed.

Two of the principal properties involved in the performance of golf balls are resilience and hardness. Resilience is determined by the coefficient of restitution (C.O.R.), the constant "e", which is the ratio of the relative velocity of two elastic spheres after direct impact to that before impact, or more generally, the ratio of the outgoing velocity to incoming velocity of a rebounding ball. As a result, the coefficient of restitution (i.e. "e") can vary from zero to one, with one being equivalent to an elastic collision and zero being equivalent to an inelastic collision. Hardness is determined as the deformation (i.e. compression) of the ball under various load conditions applied across the ball's diameter (i.e. the lower the compression value, the harder the material).

Resilience (C.O.R.), along with additional factors such as clubhead speed, angle of trajectory, and ball configuration (i.e. dimple pattern), generally determines the distance a ball will travel when hit. Since clubhead speed and the angle of trajectory are not factors easily controllable, particularly by golf ball manufacturers, the factors of concern among manufacturers are the coefficient of restitution (C.O.R.) and the surface configuration of the ball.

In this regard, the coefficient of restitution of a golf ball is generally measured by propelling a ball at a given speed against a hard surface and measuring the ball's incoming and outgoing velocity electronically. The coefficient of restitution must be carefully controlled in all commercial golf balls in order for the ball to be within the specifications regulated by the United States Golfers Association (U.S.G.A.). Along this line, the U.S.G.A. standards indicate that a "regulation" ball cannot have an initial velocity (i.e. the speed off the club) exceeding 255 feet per second (250 feet per second with a 2% tolerance). Since the coefficient of restitution of a ball is related to the ball's initial velocity (i.e. as the C.O.R. of a ball is increased, the ball's initial velocity will also increase), it is highly desirable to produce a ball having a sufficiently high coefficient of restitution to closely approach the U.S.G.A. limit on initial velocity, while having an ample degree of hardness (i.e. impact resistance) to produce enhanced durability.

The coefficient of restitution (C.O.R.) in solid core balls is a function of the composition of the molded core and of the cover. In balls containing a wound core (i.e. balls comprising a liquid or solid center, elastic windings, and a cover), the coefficient of restitution is a function of not only the composition of the center and cover, but also the composition and tension of the elastomeric windings.

The present invention relates to the addition of a polypropylene powder resin to polybutadiene core compositions, such as those disclosed in U.S. Pat. Nos. 4,726,590; 4,838, 556; 4,844,471; and 4,852,884 in order to produce solid golf ball cores and/or centers exhibiting enhanced hardness without an increase in weight and a, substantial reduction in C.O.R. It has been found that the addition of a polypropylene powder resin results in a core which is too hard (i.e. exhibits low compression) and thus allows for a reduction in the amount of crosslinking agent utilized to soften the core to a normal compression.

Furthermore, because polypropylene powder resin can be added to core composition without an increase in weight of the molded core upon curing, the addition of the polypropylene powder allows for the addition of large amounts of higher specific gravity fillers, such as mineral fillers. Since the crosslinking agents utilized in the polybutadiene core compositions are expensive and/or the higher specific gravity fillers are relatively inexpensive, the addition of the polypropylene powder resin substantially lowers the cost of the golf ball cores while maintain proper weight and compression.

Along these lines, although other particulate thermoplastic materials have been evaluated, including relatively low specific gravity thermoplastic powders (i.e. polystyrene, polyethylene, polymethyl methacrylate, etc.), it has been found that these powdered resins do not increase the hardness of the cores to the degree desired, thus still requiring use of larger amounts of the expensive crosslinking agents such as zinc diacrylate, and/or they reduce the C.O.R. values to undesirable ranges. Furthermore, the alternative thermoplastic powder resins produce, when compounded, heavier cores than the present invention. Consequently, the addition of the inexpensive mineral fillers is substantially limited in the powdered plastics in comparison .to the present invention.

Accordingly, it is an object of the present invention to provide improved polybutadiene core compositions which, when utilized to formulate golf balls., produce golf balls exhibiting enhanced hardness at a lower weight due to the composition of the core. An additional object of the invention is to provide cores or centers for the construction of solid or wound golf balls which dramatically lower the cost of the golf ball while maintaining proper weight and compression. Furthermore, since a golf ball produced in accordance with the present invention exhibits an enhanced hardness at a lower weight, it is possible to increase the durability of the ball by adding additional durability enhancers without greatly sacrificing the ball's overall weight and/or composition. A still further object of the invention is to produce golf ball cores or centers which maintain their roundness and shape upon continued impact by a golf club.

These and other objects and features of the invention will be apparent from the following summary and description of the invention and from the claims.

SUMMARY OF THE INVENTION

In one aspect, the present invention is directed to an improved composition for golf ball core production comprising a base elastomer selected from polybutadiene and mixtures of polybutadiene with other elastomers, at least one metallic salt of an unsaturated carboxylic acid (a co-crosslinking agent), a free radical initiator (a co-crosslinking agent) and a polypropylene powder resin. In addition, suitable and compatible modifying ingredients including, but not limited to, metal oxide activators, fatty acids, fillers and other additives may be included. In an additional aspect, the present invention relaters to a golf ball comprising a solid core and a cover therefor, the solid core consisting of a base elastomer selected from polybutadiene and mixtures of polybutadiene with other elastomers, at least one metallic salt of an unsaturated carboxylic acid, a free radical initiator and a particulate polypropylene powder, and the cover comprising one or more layers of ionomer resin-based compositions.

In a further aspect, the present invention is directed to a method for reducing the amount of crosslinking agent utilized to formulate a core composition through the incorporation of a polypropylene powder resin. In a still further aspect, a method for decreasing the amount of a crosslinking agent and increasing the amount of mineral fillers in a core composition through the incorporation of a polypropylene powder resin is also disclosed.

Further scope of the applicability of the invention will become apparent from the detailed description provided below.

DETAILED DESCRIPTION OF THE INVENTION

The present invention is directed to improved core compositions which, when utilized for golf ball core construction, produce cores exhibiting enhanced hardness without an increase in weight and/or a decrease in resilience. In this regard, it has been found that the addition of a polypropylene powder resin to polybutadiene core compositions has the effect of increasing the hardness of the resultant cores.

In addition, the present invention is directed to the discovery that the particulate polypropylene powder can be added to various polybutadiene core compositions as a cost: effective means of lowering compression (i.e. hardness) or the molded cores. Since the addition of the polypropylene powder produces cores that are too hard, a substantial reduction in the use of expensive crosslinking agents, such as zinc diacrylate, can be achieved in order to soften the center to a normal compression.

Furthermore, because the specific gravity of polypropylene is very low (0.90 g/cm$^3$) and the polypropylene powders produce a lighter weight molded core upon curing, large amounts of higher specific gravity, less expensive, mineral fillers such as calcium carbonate can be utilized. As a result, the addition of the particulate polypropylene powder dramatically lowers the cost of the core composition while maintaining the weight and compression desired.

The polypropylene ($C_3H_5$) powder suitable for use in the present invention has a specific gravity of about 0.90 g/cm$^3$, a melt flow rate of about 4 to about 12 and a particle size distribution of greater than 99% through a 20 mesh screen. Examples of such polypropylene powder resins include those sold by the Amoco Chemical Co., Chicago, Ill., under the designations "6400 P", "7000 P" and "7200 P". The typical properties of these resins are listed below:

| Properties of Resin | 6400 P | 7000 P | 7200 P |
|---|---|---|---|
| Melt flow rate, ASTM D1238, 2.16 kg at 230° C. | 4 | 10 | 12 |
| Density, ASTM D792 at 23° C. g/cm$^3$ | 0.90 | 0.90 | 0.90 |
| Particle size distribution, ASTM D1921 | 0 | 0 | 0 |
| 12 screen mesh, % retained | >99 | >99 | >99 |
| smaller than 140 screen mesh, % | <1 | <1 | <1 |

In general, polypropylene (unfilled) possess the following properties:

| Properties | ASTM test method | Polypropylene Unfilled |
|---|---|---|
| 1. Melting temperature, ° C. $T_m$ (crystalline) | | 160–175 |
| 2. Processing temperature range, ° F. (C = compression; T = transfer; I = Injection; E = extrusion) | | I: 400–550 E: 400–500 |
| 3. Molding pressure range, 10$^3$ p.s.i. | | 10–20 |
| 4. Compression ratio | | 2.0–2.4 |
| 5. Mold (linear) shrinkage, in./in. | D955 | 0.010–0.025 |
| 6. Tensile strength at break, p.s.i. | D638 | 4500–6000 |
| 7. Elongation at break, % | D638 | 100–600 |
| 8. Tensile yield strength, p.s.i. | D638 | 4500–5400 |
| 9. Compressive strength (rupture or yield), p.s.i. | D695 | 5500–8000 |
| 10. Flexural strength (rupture or yield), p.s.i. | D790 | 6000–8000 |
| 11. Tensile modulus, 10$^3$ p.s.i. | D638 | 165–225 |
| 12. Compressive modulus, 10$^3$ p.s.i. | D695 | 150–300 |
| 13. Flexural modulus, 10$^3$ p.s.i  73° F. | D790 | 170–250 |
|  200° F. | D790 | 50 |
|  250° F. | D790 | 35 |
|  300° F. | D790 | |
| 14. Izod impact, ft.-lb./in. of notch (¼–in. thick specimen) | D256A | 0.4–1.2 |
| 15. Hardness  Rockwell | D785 | R80–102 |
|  Shore/Barcol | D2240/ 25833 | |
| 16. Coef. of linear thermal expansion, 10$^{-8}$ in./in.° C. | D696 | 81–100 |
| 17. Deflection temperature under flexural load, ° F.  264 p.s.i. | D648 | 120–140 |
|  66 p.s.i. | D648 | 225–250 |
| 18. Thermal conductivity, 10$^{-4}$ cal.-cm./ sec.-cm.$^{2°}$ C. | C177 | 2.8 |
| 19. Specific gravity | D792 | 0.900–0.910 |
| 20. Water absorption (⅛–in. thick specimen), %  24 hr. | D570 | 0.01–0.03 |
|  Saturation | D570 | |
| 21. Dielectric strength (⅛–in. thick specimen), short time, v./mil | D149 | 600 |

It has been found that the addition of polypropylene in particulate form, such as polypropylene powder resins, substantially enhances the desired properties of the core compositions over known golf ball core additives including other known thermoplastic polymers in powdered form.

The core compositions and resulting molded golf balls of the present invention containing the particulate polypropylene resins are manufactured using conventional ingredients and techniques. In this regard, the core compositions of the invention may be based on polybutadiene, and mixtures of polybutadiene with other elastomers. It is preferred that the base elastomer have a relatively high molecular weight. The broad range for the molecular weight of suitable base elastomers is from about 50,000 to about 500,000. A more preferred range for the molecular weight of the base elastomer is from about. 100,000 to about 500,000. As a base elastomer for the core; composition, cis-polybutadiene is preferably employed, or a blend of cis-polybutadiene with other elastomers may also be utilized. Most preferably, cis-polybutadiene having a weight-average molecular weight of from about 100,000 to about 500,000 is employed. Along this line, it has been found that the high cis-polybutadiene manufactured and sold by Shell Chemical Co., Houston, Tex., under the tradename Cariflex BR-1220, and the polyisoprene available from Muehlstein, H & Co., Greenwich, Conn. under the designation "SKI 35" are particularly well suited.

The unsaturated carboxylic acid component of the core composition (a co-crosslinking agent) is the reaction product of the selected carboxylic acid or acids and an oxide or carbonate of a metal such as zinc, magnesium, barium, calcium, lithium, sodium, potassium, cadmium, lead, tin, and the like. Preferably, the oxides of polyvalent metals such as zinc, magnesium and cadmium are used, and most preferably, the oxide is zinc oxide.

Exemplary of the unsaturated carboxylic acids which find utility in the present core compositions are acrylic acid, methacrylic acid, itaconic acid, crotonic acid, sorbic acid, and the like, and mixtures thereof., Preferably, the acid component is either acrylic or methacrylic acid. Usually, from about 20 to about 50, and preferably from about 2.5 to about 35 parts by weight of the carboxylic acid salt, such as zinc diacrylate, is included in the core composition. The unsaturated carboxylic acids and metal salts thereof are generally soluble in the elastomeric base, or are readily dispersible.

The free radical initiator included in the cores composition is any known polymerization initiator (.a co-crosslinking agent) which decomposes during the cure cycle. The term "free radical initiator" as used herein refers to a chemical which, when added to a mixture of the elastomeric blend and a metal salt of an unsaturated, carboxylic acid, promotes crosslinking of the elastomers by the metal salt of the unsaturated carboxylic acid. The amount of the selected initiator present is dictated only by the requirements of catalytic activity as a polymerization initiator. Suitable initiators include peroxides, persulfates, azo compounds and hydrazides. Peroxides which are readily commercially available are conveniently used in the present invention, generally in amounts of from about 0.1 to about 10.0 and preferably in amounts of from about 0.3 to about 3.0 parts by weight per each 100 parts of elastomer.

Exemplary of suitable peroxides for the purposes of the present invention are dicumyl peroxide, n-butyl 4,4'-bis (butylperoxy) valerate, 1,1-bise(t-butylperoxy)-3,3,5-trimethyl cyclohexane, di-t-butyl peroxide and 2,5-di-(t-butylperoxy)-2,5 dimethyl hexane and the like, as well as mixtures thereof. It will be understood that the total amount of initiators used will vary depending on the specific end product desired and the particular initiators employed.

Examples of such commercial available peroxides are Luperco 230 or 231 XL, a peroxyketal manufactured and sold by Atochem, Lucidol Division, Buffalo, N.Y., and Trigonox 17/40 or 29/40, al, 1-di-(t-butylperoxy)-3,3,5-trimethyl cyclohexane sold by Akzo Chemie America, Chicago, Ill. The one hour half life of Luperco 231. XL is about 112° C., and the one hour half life of Trigonox 29/40 is about 129° C.

The core compositions of the present invention may additionally contain any other suitable and compatible modifying ingredients including, but not limited to, metal oxides, fatty acids, and diisocyanates. For example, Papi 94, a polymeric diisocyanate, commonly available from Dow Chemical Co., Midland, Mich., is an optional component in the rubber compositions. It can range from about 0 to 5 parts by weight per 100 parts by weight rubber (phr) component, and acts as a moisture scavenger.

Various activators may also be included in the compositions of the present invention. For example, zinc oxide and/or magnesium oxide are activators for the polybutadiene. The activator can range from about 2 to about 30 parts by weight per 100 parts by weight of the rubbers (phr) component.

Moreover, filler-reinforcement agents may be added to the composition of the present invention. Since the specific gravity of polypropylene powder is very low, and when compounded, the polypropylene powder produces a lighter molded core, large amounts of higher gravity fillers may be added. Additional benefits may be obtained by the incorporation of relatively large amounts of higher specific gravity, inexpensive mineral fillers such as calcium carbonate. Such fillers as are incorporated into the core compositions should be in finely divided form, as for example, in a size generally less than about 30 mesh and preferably less than about 100 mesh U.S. standard size. The amount of additional filler included in the core composition is primarily dictated by weight restrictions and preferably is included in amounts of from about 10 to about 1.00 parts by weight per 100 parts rubber.

The preferred fillers are relatively inexpensive and heavy and serve to lower the cost of the ball and to increase the weight of the ball to closely approach the U.S.G.A. weight limit of 1.620 ounces. Exemplary fillers include mineral fillers such as limestone, silica, mica barytes, calcium carbonate, or clays. Limestone is ground calcium/magnesium carbonate and is used because it is an inexpensive, heavy filler.

As indicated, ground flash filler may be incorporated and is preferably 20 mesh ground up center stock from the excess flash from compression molding. It lowers the cost and may increase the hardness of the ball.

Fatty acids or metallic salts of fatty acids may also be included in the compositions, functioning to improve moldability and processing. Generally, free fatty acids having from about 10 to about 40 carbon atoms, and preferably having from about 15 to about 20 carbon atoms, are used. Exemplary of suitable fatty acids are stearic acid and linoleic acids, as well as mixtures thereof. Exemplary of suitable metallic salts of fatty acids include zinc stearate. When included in the core compositions, the fatty acid component is present in amounts of from about 1 to about 25, preferably in amounts from about 2 to about 15 parts by weight based on 100 parts rubber (elastomer).

It is preferred that the core compositions include stearic acid as the fatty acid adjunct in an amount of from about 2 to about 5 parts by weight per 100 parts of rubber.

Diisocyanates may also be optionally included in the core compositions when utilized, the diioscyanates are included in amounts of from about 0.2 to about 5.0 parts by weight based on 100 parts rubber. Exemplary of suitable diisocyanates is 4,4'-diphenylmethane diisocyanate and other polyfunctional isocyanates know to the art.

Furthermore, the dialkyl tin difatty acids set forth in U.S. Pat. No. 4,844,471, the dispersing agents disclosed in U.S. Pat. No. 4,838,556, and the dithiocarbonates set forth in U.S. Pat. No. 4,852,884 may also be incorporated into the polybutadiene compositions of the present invention. The specific types and amounts of such additives are set forth in the above identified patents, which are incorporated herein by reference.

The golf ball core compositions of the invention are generally comprised of the addition of about 1 to about 100 parts by weight of particulate polypropylene resin (preferably about 10 to about 100 parts by weight polypropylene powder resin) to core compositions comprised of 100 parts by weight of a base elastomer (or rubber) selected from polybutadiene and mixtures of polybutadienes with other elastomers, 20 to 50 parts by weight of at least one metallic salt of an unsaturated carboxylic acid, and 1 to 10 parts by weight of a free radical initiator. More preferably, the particulate polypropylene resin utilized in the present invention comprises from about 20 to about 40 parts by weight of a polypropylene powder resin such as that trademarked and sold by Amoco Chemical Co. under the designation "6400 P", "7000 P" and "7200 P". The ratios of the ingredients may vary and are best optimized empirically.

As indicated above, additional suitable and compatible modifying agents such as fatty acids, and secondary additives such as Pecan shell flour, ground flash (i.e. grindings from previously manufactured cores of substantially identical construction), barium sulfate, zinc oxide, etc. may be added to the core compositions to increase the weight of the ball as necessary in order to have the ball reach or closely approach the U.S.G.A. weight limit of 1.620 ounces.

In producing golf ball cores utilizing the present compositions, the ingredients may be intimately mixed using, for example, two roll mills or a Banbury mixer until the composition is uniform, usually over a period of from about 5 to about 20 minutes. The sequence of addition of components is not critical. A preferred blending sequence is as follows.

The elastomer, polypropylene powder resin, fillers, zinc salt, metal oxide, fatty acid, and the metallic dithiocarbamate (if desired), surfactant (if desired), and tin difatty acid (if desired), are blended for about 7 minutes in an internal mixer such as a Banbury mixer. As a result of shear during mixing, the temperature rises to about 200° F. The initiator and diisocyanate are then added and the mixing continued until the temperature reaches about 220° F. whereupon the batch is discharged onto a two roll mill, mixed for about one minute and sheeted out.

The sheet is then placed in a Barwell preformer and slugs are produced. The slugs are then subjected to compression molding at about 320° F. for about 14 minutes. After molding and cooling, the cooling effected at room temperature for about 4 hours, the molded cores are subjected to a centerless grinding operation whereby a thin layer of the molded core is removed to produce a round core having a diameter of 1.545 inches.

The mixing is desirably conducted in such a manner that the composition does not reach incipient polymerization temperatures during the blending of the various components.

Usually the curable component of the composition will be cured by heating the composition at elevated temperatures on the order of from about 275° F. to about 350° F., preferably and usually from about 290° F. to about 325° F., with molding of the composition effected simultaneously with the curing thereof. The composition can be formed into a core structure by any one of a variety of molding techniques, e.g. injection, compression, or transfer molding. When the composition is cured by heating, the time required for heating will normally be short, generally from about 10 to about 20 minutes, depending upon the particular curing agent used. Those of ordinary skill in the art relating to free radical curing agents for polymers are conversant with adjustments of cure times and temperatures required to effect optimum results with any specific free radical agent.

After molding, the core is removed from the mold and the surface thereof, preferably treated to facilitate adhesion thereof to the covering materials. Surface treatment can be effected by any of the several techniques; known in the art, such as corona discharge, ozone treatment, sand blasting, and the like. Preferably, surface treatment is effected by grinding with an abrasive wheel.

The core is converted into a golf ball by providing at: least one layer of covering material thereon, ranging in thickness from about 0.050 to about 0.250 inch and preferably from about 0.060 to about 0.090 inch. The cover composition preferably is made from ethylene-acrylic acid or ethylene-methacrylic acid copolymers neutralized with mono or polyvalent metals such as sodium, potassium,, lithium, calcium, zinc, or magnesium.

The ionic copolymers used to produce the cover compositions may be made according to known procedures, such as those in U.S. Pat. No. 3,421,766 or British Patent No. 963,380, with neutralization effected according to procedures disclosed in Canadian Patent No. 674,595 and 713, 631, wherein the ionomer is produced by copolymerizing the olefin and carboxylic acid to produce a copolymer having the acid units randomly distributed along the polymer chain. The ionic copolymer comprises one or more α-olefins and from about 9 to about 15 weight percent of α, β-ethylenically unsaturated mono- or dicarboxylic acid, the basic copolymer neutralized with metal ions to the extent desired.

At least 18% of the carboxylic acid groups of the copolymer are neutralized by the metal ions, such as sodium, potassium, zinc, calcium, magnesium, and the like, and exist in the ionic state.

Suitable olefins for use in preparing the ionomeric resins include,. but are not limited to,, ethylene, propylene, butene-1, hexene-1, and the like. Unsaturated carboxylic acids include, but are not limited to, acrylic, methacrylic, ethacrylic, α-chloroacrylic, crotonic, maleic, fumaric, itaconic acids, and the like. Preferably, the ionomeric resin is a copolymer of ethylene with acrylic and/or methacrylic acid, such as those disclosed in U.S., Pat. Nos. 4,884,814; 4,911,451; 4,986,545 and 5,098,105, incorporated herein by reference.

In this regard, the ionomeric resins sold by E. I. DuPont de Nemours Company under the trademark "Surlyn®", and the ionomer resins sold by Exxon Corporation under either the trademark "Escort®" or the tradename "Iotek" are examples of commercially available ionomeric resins which may be utilized in the present invention. The ionomeric resins sold formerly under the designation "Escor®" and now under the new name "Iotek", are very similar to those sold under the "Surlyn®" trademark in that the "Iotek" ionomeric resins are available as sodium of zinc salts of poly(ethylene acrylic acid) and the "Surlyn" resins are available as zinc or sodium salts of poly(ethylene methacrylic acid). In addition various blends of "Iotek" and "Surlyn®" ionomeric resins, as well as other available ionomeric resins, may be utilized in the present invention.

In the embodiments of the invention that are set forth below in the Examples, the cover included acrylic acid ionomer resin having the following compositions:

|  | % weight |
|---|---|
| Iotek 4000 (7030)[1] | 52.4 |
| Iotek 8000 (900)[2] | 45.3 |
| Unitane 0-110[3] | 2.25 |
| Ultramarine blue[4] | 0.0133 |
| Santonox R[5] | 0.0033 |

[1]Iotek 4000 is a zinc salt of poly (ethylene acrylic acid)
[2]Iotek 8000 is a sodium salt of poly (ethylene acrylic acid)
[3]Unitane 0-100 is a titanium dioxide sold by Kemira Inc., Savannah, GA.
[4]Ultramarine Blue is a dye sold by Whitaker, Clark, and Daniels of South Painsfield, N.J.
[5]Santonox R is a antioxidant sold by Monsanto, St. Louis, MO.

The covered golf ball can be formed in any one of the several methods known to the art. For example, the molded core may be placed in the center of a golf ball mold and the ionomeric resin-containing cover composition injected into and retained in the space for a period of time at a mold temperature of from about 40° F. to about 120° F.

Alternatively, the cover composition may be injection molded at about 300° F., to about 450° F. into smooth-surfaced hemispherical shells, a core and two such shells placed in a dimpled golf ball mold and unified at temperatures on the order of from about 100° F. to about 200° F.

The golf ball produced is then painted and marked, painting being effected by spraying techniques.

The present invention is further illustrated by the following examples in which the parts of the specific ingredients are by weight. It is to be understood that the present invention is not limited to the examples, and various changes and modifications may be made in the invention without departing from the spirit and scope thereof.

EXAMPLE 1

Using the ingredients tabled below, golf ball cores having a finished diameter of about 1.540 to about 1.545 inches were produced by compression molding and subsequent removal of a surface layer by grinding. Each core was formulated using 100 parts elastomer (rubber). In the formulations, the amounts of remaining ingredients are expressed in parts by weight, and the degrees of coefficient of restitution and compression achieved are set forth below.

The data for these examples are the averages for twelve cores which were produced for each example. The properties of the molded cores produced from each formulation were measured according to the following parameters:

Riehle compression is a measurement of the deformation of a golf ball in inches under a fixed static load of 200 pounds.

Coefficient of restitution (C.O.R.) was measured by firing the resulting golf ball in an air cannon at a velocity of 125 feet per second against a steel plate which is positioned 12 feet from the muzzle of the cannon. The rebound velocity was then measured. The rebound velocity was divided by the forward velocity to give the coefficient of restitution.

TABLE 1

Effect of the Addition of Polypropylene Powder Resin on the Properties of the Molded Core

| Ingredients | Formulations | | | | | | | |
|---|---|---|---|---|---|---|---|---|
|  | 1 | 2 | 3 | 4 | 5 | 6 | 7 | 8 |
| BR-1220[1] | 90 | 90 | 90 | 90 | 90 | 90 | 90 | 90 |
| SKI-35[2] | 10 | 10 | 10 | 10 | 10 | 10 | 10 | 10 |
| ZDA[3] | 31 | 31 | 31 | 31 | 27 | 23 | 23 | 23 |
| ZnO | 6.0 | 6.0 | 6.0 | 6.0 | 6.0 | 6.0 | 6.0 | 6.0 |
| Zinc Stearate | 15 | 15 | 15 | 15 | 15 | 15 | 15 | 15 |
| Limestone | 18 | 18 | 18 | 18 | 18 | 18 | 28 | 38 |
| Grd Flash | 20 | 20 | 20 | 20 | 20 | 20 | 20 | 20 |
| 6400 P[4] | 0 | 20 | 30 | 40 | 30 | 30 | 30 | 30 |
| Trig 17/40[5] | 1.5 | 1.5 | 1.5 | 1.5 | 1.5 | 1.5 | 1.5 | 1.5 |
| Papi 94[6] | .5 | .5 | .5 | .5 | .5 | .5 | .5 | .5 |
| Total | 192.0 | 212.0 | 222.0 | 232.0 | 218.0 | 214.0 | 224.0 | 234.0 |
| Properties |  |  |  |  |  |  |  |  |
| Molded Core |  |  |  |  |  |  |  |  |
| Size, inches | 1.539 | 1.539 | 1.538 | 1.539 | 1.540 | 1.540 | 1.540 | 1.540 |
| Wgt., grams | 36.5 | 35.6 | 35.1 | 34.8 | 35.0 | 34.6 | 35.6 | 36.7 |
| Comp. (Riehle) | .064 | .057 | .056 | .054 | .060 | .065 | .065 | .062 |
| $\bar{e}$ (C.O.R.) | .796 | .783 | .773 | .763 | .767 | .760 | .752 | .747 |
| Molded Ball |  |  |  |  |  |  |  |  |
| Size, inches | 1.683 | 1.683 | 1.682 | 1.683 | 1.683 | 1.683 | 1.683 | 1.683 |
| Wgt., grams | 45.4 | 44.5 | 44.1 | 43.7 | 43.3 | 43.4 | 44.5 | 45.4 |
| Comp. (Riehle) | .050 | .040 | .037 | .037 | .045 | .054 | .051 | .050 |
| $\bar{e}$ (C.O.R.) | .811 | .796 | .787 | .777 | .785 | .780 | .775 | .767 |

[1]BR-1220 is polybutadiene manufactured and sold by Shell Chemical Co., Houston, Texas.
[2]SKI-35 is a polyisoprene available from Muehlstein, H. & Co., Greenwich, Connecticut.
[3]ZDA is zinc diacrylate.
[4]6400 P is a powdered polypropylene available from Amoco Chemical Co., Chicago, Illinois.
[5]Trig 17/40 is Trigonex 17/40 manufactured and sold by Akzo Chemie America, Chicago, Illinois.
[6]Papi 94 is a polymeric diisocyanate available from Dow Chemical Co., Midland, Michigan.

TABLE 2

Effect of the Addition of Polypropylene Powder Resin as the Properties of the Molded Core

| Ingredients | Formulations | | | | | | | |
|---|---|---|---|---|---|---|---|---|
| | 9 | 10 | 11 | 12 | 13 | 14 | 15 | 16 |
| BR-1220 | 90 | 90 | 90 | 90 | 90 | 90 | 90 | 90 |
| SKI-35 | 10 | 10 | 10 | 10 | 10 | 10 | 10 | 10 |
| ZDA | 31 | 31 | 29 | 27 | 25 | 23 | 21 | 20 |
| ZnO | 6.0 | 6.0 | 6.0 | 6.0 | 6.0 | 6.0 | 6.0 | 6.0 |
| Zinc Stearate | 15 | 15 | 15 | 15 | 15 | 15 | 15 | 15 |
| Limestone | 18 | 18 | 22 | 26 | 32 | 38 | 44 | 50 |
| Grd Flash | 20 | 20 | 20 | 20 | 20 | 20 | 20 | 20 |
| 6400 P | 0 | 1 | 5 | 10 | 20 | 30 | 40 | 50 |
| Trig 17/40 | 1.5 | 1.5 | 1.5 | 1.5 | 1.5 | 1.5 | 1.5 | 1.5 |
| Papi 94 | .5 | .5 | .5 | .5 | .5 | .5 | .5 | .5 |
| Total | 192.0 | 193.0 | 199.0 | 206.0 | 220.00 | 234.0 | 248.0 | 263.0 |
| Cost/lb vs. No. 9 | — | −$.0010 | −$.0266 | −$.0470 | −$.0761 | −$.1014 | −$.1238 | −$.1436 |
| Properties | | | | | | | | |
| Molded Core | | | | | | | | |
| Size, inches | 1.541 | 1.540 | 1.539 | 1.542 | 1.542 | 1.543 | 1.544 | 1.544 |
| Wgt., grams | 36.7 | 36.6 | 36.6 | 37.3 | 36.7 | 37.0 | 36.9 | 37.0 |
| Comp. (Riehle) | .063 | .064 | .065 | .057 | .064 | .062 | .064 | .063 |
| $\bar{e}$ (C.O.R.) | .796 | .793 | .785 | .787 | .759 | .744 | .720 | .705 |
| Molded Ball | | | | | | | | |
| Size, inches | 1.683 | 1.683 | 1.683 | 1.683 | 1.684 | 1.683 | 1.684 | 1.684 |
| Wgt., grams | 45.2 | 45.3 | 45.3 | 45.9 | 45.3 | 45.4 | 45.4 | 45.4 |
| Comp. (Riehle) | .053 | .053 | .053 | .048 | .053 | .053 | .054 | .052 |
| $\bar{e}$ (C.O.R.) | .811 | .810 | .802 | .798 | .780 | .767 | .750 | .735 |

| Ingredients | Formulations | | | | |
|---|---|---|---|---|---|
| | 17 | 18 | 19 | 21 | 20 |
| BR-1220 | 90 | 90 | 90 | 90 | 90 |
| SKI-35 | 10 | 10 | 10 | 10 | 10 |
| ZDA | 20 | 19 | 18 | 17 | 16 |
| ZnO | 6.0 | 6.0 | 6.0 | 6.0 | 6.0 |
| Zinc Stearate | 15 | 15 | 15 | 15 | 15 |
| Limestone | 55 | 60 | 65 | 70 | 75 |
| Grd Flash | 20 | 20 | 20 | 20 | 20 |
| 6400 P. | 60 | 70 | 80 | 90 | 100 |
| Trig 17/40 | 1.5 | 1.5 | 1.5 | 1.5 | 1.5 |
| Papi 94 | .5 | .5 | .5 | .5 | .5 |
| Total | 278.0 | 292.0 | 306.0 | 320.0 | 334.0 |
| Cost/lb vs. No. 9 | $.1497 | −$.1616 | −$.1725 | −$.1824 | −$.1914 |
| No. 9 Properties | | | | | |
| Molded Care | | | | | |
| Size, inches | 1.542 | 1.545 | 1.545 | 1.547 | 1.546 |
| Wgt., grams | 36.9 | 36.9 | 36.8 | 36.8 | 37.0 |
| Comp. (Riehle) | .061 | .062 | .063 | .061 | .061 |
| $\bar{e}$ (C.O.R.) | .695 | .682 | .648 | .636 | .635 |
| Molded Ball | | | | | |
| Size, inches | 1.684 | 1.683 | 1.684 | 1.683 | 1.682 |
| Wgt., grams | 45.4 | 45.3 | 45.3 | 45.2 | 45.3 |
| Comp. (Riehle) | .053 | .052 | .053 | .053 | .053 |
| $\bar{e}$ (C.O.R.) | .721 | .708 | .695 | .688 | .674 |

As it can be seen in Formulations 1–4, the inclusion of the polypropylene powder resin (unfluxed) to polybutadiene core compositions has the effect of producing lighter, harder and slower molded cores. As a result of the increase hardness, the amount of the zinc diacrylate crosslinking agent utilized can be reduced in order to soften the molded cores to a normal compression. See Formulations 5–8.

Moreover, because the specific gravity of polypropylene is very low and the polypropylene powder resin produces a lighter core when molded, large amounts of higher specific gravity mineral fillers such as limestone can be added. Consequently, the addition of the polypropylene powder resin (from 20 to 40 phr in Table 1) allows for a reduction in the amount of crosslinking agent utilized and an increase in the amount of filler while maintaining the proper weight and compression of the molded cores. In Table 1, Formulation 8 is the preferred embodiment.

Formulations 9–21 set forth in Table 2 further demonstrate the effect produced by the addition of the polypropylene powder resin (from 1 to 100 phr). As the amount of polypropylene is increased, the amount of the zinc diacrylate crosslinking agent is decreased while the amount of mineral filler (i.e. limestone) is substantially increased (i.e. for example, in Table 2 an increase in 10 phr of polypropylene powder resulted in a reduction of about 1.5 phr ZDA and an increase of about 5.7 phr mineral filler). Due to the decrease in resilience (i.e. C.O.R.) also produced by the addition of the polypropylene powder resin, Formulation 14 is the more preferred embodiment (i.e. optimal hardness and weight as well as C.O.R.) of the invention.

Furthermore, from a product cost perspective, the addition of the polypropylene powder (i.e. about $0.36/lb.), and the resulting reduction in the amount of the very expensive crosslinking agent utilized (such as zinc diacrylate), and in turn the increase in the amount of inexpensive mineral fillers (such as limestone at, $0.04/lb.), the overall cost of the molded cores are substantially lowered while the proper weight and compression is maintained. This is also exhibited in the Formulations set forth in Table 2.

TABLE 3

Comparison of the Addition of Various Low Specific Gravity Powdered Plastics On the Properties of the Molded Cores

| Ingredients | Formulations | | | | | | |
| --- | --- | --- | --- | --- | --- | --- | --- |
|  | 22 | 23 | 24 | 25 | 26 | 27 | 28 |
| BR-1220 | 100 | 100 | 100 | 100 | 100 | 100 | 100 |
| ZDA | 25 | 25 | 25 | 25 | 25 | 25 | 25 |
| Grd Flash | 20 | 20 | 20 | 20 | 20 | 20 | 20 |
| ZnO | 5.0 | 5.0 | 5.0 | 5.0 | 5.0 | 5.0 | 5.0 |
| Zinc Stearate | 15 | 15 | 15 | 15 | 15 | 15 | 15 |
| Verflake | 25 | 25 | 25 | 25 | 25 | 25 | 25 |
| Polyester 70 Mesh | 0 | 25 | 0 | 0 | 0 | 0 | 0 |
| Nylon 70 Mesh | 0 | 0 | 25 | 0 | 0 | 0 | 0 |
| Texture 5388 | 0 | 0 | 0 | 25 | 0 | 0 | 0 |
| 6800 P | 0 | 0 | 0 | 0 | 25 | 0 | 0 |
| 7200 P | 0 | 0 | 0 | 0 | 0 | 25 | 0 |
| Huntsman P.P. 170 | 0 | 0 | 0 | 0 | 0 | 0 | 25 |
| 231 XL | 0.90 | 0.90 | 0.90 | 0.90 | 0.90 | 0.90 | 0.90 |
| Papi | 0.50 | 0.50 | 0.50 | 0.50 | 0.50 | 0.50 | 0.50 |
| Properties |  |  |  |  |  |  |  |
| Molded Core |  |  |  |  |  |  |  |
| Wgt., grams | 37.0 | 37.2 | 36.7 | 36.0 | 35.7 | 35.7 | 35.8 |
| Comp. (Riehle) | 74 | 58 | 64 | 78 | 55 | 54 | 55 |
| $\bar{e}$ (C.O.R.) | .786 | .773 | .753 | .732 | .771 | .770 | .767 |

The data demonstrates that the addition of the polypropylene powder resin produces enhanced effects (i.e. produces a lighter and harder molded core) than the remaining powdered thermoplastics tested. While a number of the powdered plastics did show some enhancement in hardness, the increased hardness was not as significant as that demonstrated by present invention and/or the addition of the powdered plastics lead to an increase in weight upon molding and/or a substantial reduction in resiliency was noted. Similar results were also observed through the addition of powdered polymethyl methacrylate, powdered polyethylene, powdered polystyrene etc. to conventional core compositions. Consequently, the additional powdered plastics failed to exhibit the enhanced effects (i.e. the production of a lighter and harder molded core) exhibited by the present invention.

The invention has been described with reference to the preferred embodiments. Obviously, modifications and alterations will occur to others upon reading and understanding the preceding detailed description. It is intended that the invention be construed as including all such alterations and modifications insofar as they come within the scope of the claims and the equivalents thereof.

Having thus described the preferred embodiment, the invention is now claimed to be:

1. A golf ball having a cover and a core said core being formed from a composition comprising a base elastomer selected from polybutadiene and mixtures of polybutadiene with other elastomers, said polybutadiene having a molecular weight of from about 50,000 to about 500,000, at least one metallic salt of an α, β-ethylenically unsaturated monocarboxylic acid, a free radical initiator, and from about 10 to about 100 parts by weight of a polypropylene powder resin based on 100 parts by weight elastomer, wherein said polypropylene powder resin enhances the hardness of the core thereby reducing the amounts of the metallic salt of an α, β-ethylenically unsaturated monocarboxylic acid incorporated with the core relative to cores free of polypropylene.

2. The core as defined in claim 1, wherein said polypropylene powder resin has a specific gravity of about 0.90 g/cm$^3$ and a melt flow rate of about 4 to about 12.

3. The golf ball as defined in claim 1, wherein said core composition comprises from about 20 to about 40 parts by weight of the polypropylene powder resin based on 100 parts by weight elastomer.

4. The golf ball as defined by claim 1, wherein the composition further comprises a modifying ingredient selected from fillers, fatty acids, metal oxides, and mixtures thereof.

5. The golf ball as defined in claim 4, wherein said polypropylene powder resin enhances the hardness of the core without an increase in weight thereby increasing the amount of a mineral filler to be incorporated into the core.

6. A method of decreasing the amount of a metallic salt of an unsaturated carboxylic acid present in a core of a golf ball having a core and a cover, said core being formed from a composition having a base elastomer selected from polybutadiene and mixtures of polybutadiene with other elastomers, at least one metallic salt of an α, β-ethylenically unsaturated monocarboxylic acid and a free radical initiator, said method comprising the step of adding to the core composition from about 10 to about 100 parts by weight of a polypropylene powder resin based on 100 parts by weight elastomer, wherein said polypropylene powder resin enhances the hardness of the core thereby reducing the amounts of metallic salt of an α, β-ethylenically unsaturated monocarboxylic acid incorporated within the core relative to cores free of polypropylene.

7. The method of claim 6, wherein said polypropylene powder has a specific gravity of about 0.90 g/cm$^3$ and a melt flow rate of about 4 to about 12.

8. A golf ball having a core and a cover said core composition comprising an base elastomer selected from polybutadiene and mixtures of polybutadiene with the other elastomers, at least one mettallic salt of an α, β-ethylenically unsaturated monocarboxylic acid, a free radical initiator, and a filler, wherein the improvement comprises adding from about 10 to about 100 parts by weight of a low specific weight polypropylene powder resin based on 100 parts by weight elastomer to increase the hardness of the core composition without increasing the weight of the core composition thereby reducing the amount of metallic salt of an α,β-ethylenically unsatuated monocarboxylic acid and increasing the amount of filler included in the core composition relative to cores free of polypropylene.

9. The golf ball of claim 8, wherein said polypropylene powder resin has a specific gravity of about 0.90 g/cm$^3$, a melt flow rate of about 4 to about 12 and a particle size distribution at 20 mesh of about 99 percent.

10. The golf ball of claim 8, wherein said core composition comprises from about 20 to about 40 parts by weight of the polypropylene powder resin based on 100 parts by weight elastomer.

11. A golf ball comprising a cover and an improved solid molded core, said solid moled core comprising a base elastomer selected from polybutadiene and mixtures of polybutadiene with other elastomers, from about 20 to about 50 parts per weight elastomer of at least one metallic salt of an unsaturated carboxylic acid, from about 1 to about 10 parts per weight elastomer of a free radical initiator, and from about 0 to about 50 parts per weight elastomer of a filler additive, wherein the improvement comprises adding from about 10 to about 100 parts per weight elastomer of a low specific weight polypropylene powder resin to increase the hardness of the core composition thereby decreasing the amount of metallic salt of the unsaturated carboxylic acid included in the core composition relative to the amount of a metallic salt of an unsaturated carboxylic acid in a core which is free of polypropylene.

12. The golf ball of claim 11, wherein said polypropylene powder has a specific gravity of about 0.90 g/cm$^3$, a melt flow rate of about 4 to about 12 and is in a particle form less than 20 mesh.

* * * * *